United States Patent
Gan et al.

(10) Patent No.: US 8,830,839 B2
(45) Date of Patent: Sep. 9, 2014

(54) ADAPTIVE FEEDBACK OF CHANNEL INFORMATION FOR COORDINATED TRANSMISSION ON A WIRELESS BACKHAUL

(75) Inventors: Jiansong Gan, Beijing (CN); Christian Hoymann, Aachen (DE); Dennis Hui, Sunnyvale, CA (US)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 119 days.

(21) Appl. No.: 13/521,905

(22) PCT Filed: Mar. 22, 2010

(86) PCT No.: PCT/US2010/028096
§ 371 (c)(1),
(2), (4) Date: Jul. 12, 2012

(87) PCT Pub. No.: WO2011/119140
PCT Pub. Date: Sep. 29, 2011

(65) Prior Publication Data
US 2012/0300654 A1 Nov. 29, 2012

(51) Int. Cl.
*H04L 1/00* (2006.01)
*H04B 7/155* (2006.01)
*H04L 25/02* (2006.01)
*H04L 12/26* (2006.01)
*H04B 7/06* (2006.01)

(52) U.S. Cl.
CPC ............. *H04L 1/0026* (2013.01); *H04L 43/08* (2013.01); *H04B 7/155* (2013.01); *H04L 1/003* (2013.01); *H04L 25/0202* (2013.01); *H04B 7/065* (2013.01)
USPC ......................................... 370/236; 370/252

(58) Field of Classification Search
CPC ..... H04L 43/04; H04L 43/08; H04L 43/0823; H04L 43/0852; H04L 43/087; H04L 43/10; H04L 43/12; H04L 1/0026
USPC .......... 370/229–231, 235, 236, 400, 401, 252, 370/468; 455/500, 501
See application file for complete search history.

(56) References Cited

U.S. PATENT DOCUMENTS 8,520,760 B2 8/2013 Kimura et al.
2008/0049712 A1 2/2008 Terabe et al.
(Continued)

FOREIGN PATENT DOCUMENTS

EP 1750408 A2 2/2007
JP 2008-054106 A 3/2008
(Continued)

OTHER PUBLICATIONS

ZTE; "DL Performance of Type 2 Relay with Cooperative Transmission." 3GPP Draft; R1-093817. TSG-RAN WG1 #58-bis, Miyazaki, Japan, Oct. 12-16, 2009. 3GPP, Sophia Antipolis, France.

(Continued)

*Primary Examiner* — Kerri Rose
(74) *Attorney, Agent, or Firm* — Coats and Bennett, PLLC

(57) ABSTRACT

A backhaul link is established between a base station and a relay that assists the base station in communicating with a mobile device over an access link established between the relay and the mobile device. The channel response of the backhaul link is determined by estimating first and second parts of the backhaul link channel response, the second part changing faster than the first part. The first part of the backhaul link channel response is estimated by calculating an average of the backhaul link channel response over a predetermined period at the relay and the second part is estimated by calculating variation in the backhaul link channel response over the predetermined period at the relay. Quantized versions of the first and second parts of the backhaul link channel response are transmitted from the relay to the base station over the backhaul link.

33 Claims, 6 Drawing Sheets

(56) References Cited

U.S. PATENT DOCUMENTS

2009/0060064 A1    3/2009   Futaki et al.
2010/0273514 A1*  10/2010   Koo et al. .................. 455/501
2012/0307721 A1*  12/2012   Jong et al. .................. 370/316

FOREIGN PATENT DOCUMENTS

| JP | 2008-187449 A | 8/2008 |
|---|---|---|
| JP | 2010-521927 A | 6/2010 |
| WO | 2008115826 A1 | 9/2008 |
| WO | 2009011652 A1 | 1/2009 |
| WO | 2009128276 A1 | 10/2009 |
| WO | 2010082884 A1 | 7/2010 |
| WO | 2010122535 A2 | 10/2010 |
| WO | 2011039703 A3 | 4/2011 |

OTHER PUBLICATIONS

Alcatel-Lucent, "Comparison of CSI Feedback Schemes." 3GPP Draft; R1-093343. 3GPP TSG RAN WG1 #58, Shenzhen, China, Aug. 24-28, 2009. 3GPP, Sophia Antipolis, France.

Alcatel-Lucent, "CQI and CSI Feedback Compression." 3GPP Draft; R1-093334. 3GPP TSG RAN WG1 #58, Shenzhen, China, Aug. 24-28, 2009. 3GPP, Sophia Antipolis, France.

Parkvall, Stefan, et al., "LTE-Advanced-Evolving LTE towards IMT-Advanced." Sep. 2008. Ericsson Research, Stockholm, Sweden.

International search report, International application PCT/US2010/028096. Date of mailing: Dec. 15, 2011. European Patent Office, Rijswijk, Netherlands.

Foschini, G. et al. "The Value of Coherent Base Station Coordination." 2005 Conference on Information Sciences and Systems, The John Hopkins University, Mar. 16-18, 2005, pp. 1-6.

Ericsson. "LTE-Advanced—Coordinated Multipoint transmission/reception." TSG-RAN WG1 #53bis, R1-082469, Warsaw, Poland, Jun. 30-Jul. 4, 2008, pp. 1-6.

3RD Generation Partnership Project. "3rd Generation Partnership Project; Technical Specification Group Radio Access Network; Further Advancements for E-UTRA Physical Layer Aspects (Release 9)." 3GPP TR 36.814, V1.2.0, Jun. 2009, Sophia Antipolis Valbonne, France, pp. 1-38.

Thoen, S. et al. "Modeling the Channel Time-Variance for Fixed Wireless Communications." IEEE Communications Letters, vol. 6, No. 8, Aug. 2002, pp. 331-333.

Ojala, J. et al. "On the Propagation Characteristics of the 5 GHz Rooftop-to-Rooftop Meshed Network." IST Mobile & Wireless Telecommunications Summit 2002, Jun. 2002, Thessaloniki, Greece, pp. 1-6.

Baum, D. et al. "Final Report on Link Level and System Level Channel Models." IST-2003-507581 Winner, D5.4 v. 1.4, Nov. 18, 2005, pp. 1-167.

Krasny, L. et al. "An Efficient Feedback Scheme with Adaptive Bit Allocation for Dispersive MISO Channels." 14th European Signal Processing Conference (EUSIPCO 2006), Florence, Italy, Sep. 4-8, 2006, pp. 1-5.

* cited by examiner

ADAPTIVE FEEDBACK OF CHANNEL INFORMATION FOR COORDINATED TRANSMISSION ON A WIRELESS BACKHAUL

TECHNICAL FIELD

The present invention generally relates to adaptive feedback of channel state information, and more particularly relates to adaptive feedback of channel state information for coordinated transmission on a wireless backhaul link.

BACKGROUND

Multiple, geographically dispersed antennas connected to a central baseband processing unit are used as a cost-efficient way of building networks. With the base band processing located in a single node, coordinated multi-point (CoMP) transmission/reception can be deployed. In the downlink, transmissions from multiple transmission points are coordinated. Depending on to what extent the terminals are aware of transmissions originating from multiple points, three different alternatives can be envisioned. In the first alternative A, the terminals are not aware of the transmission originating from multiple, geographically separated points. The same receiver processing and measurement reporting as for single-point transmission is therefore used. Hence, in principle, the introduction of multi-point transmission can be made in a backward compatible way, benefiting preexisting LTE (Long Term Evolution) terminals. The network can, e.g., based on existing path loss measurements, determine from which transmission points to transmit to a specific terminal. As the terminals are not aware of the presence of multipoint transmission, UE (User Equipment)-specific reference signals are used for channel estimation. In this setting, CoMP provides diversity gains similar to those found in single-frequency broadcast networks and results in improved power amplifier utilization in the network, especially in a lightly loaded network where otherwise some power amplifiers would be idle.

In the second alternative, the terminals provide channel-status feedback to the network for all downlink channels visible to a particular terminal while the receiver processing remains the same as for single-point transmission. At the network side, as all processing is located in a single node, fast dynamic coordination of the transmission activity at the different transmission points is possible. For example, the signal transmitted to a particular terminal can be spatially pre-filtered to reduce inter-user interference. This type of CoMP transmission can in principle provide similar benefits as the first alternative described above, but in addition to improving the strength of the desired signal, the second alternative also allows for coordinating the inter-user interference to further improve the SNR (Signal to Noise Ratio). Since the terminal is not aware of the exact processing in the network, UE-specific reference signals are needed.

In the third alternative, the channel-status reporting is the same as the second alternative. However, unlike the second alternative, the terminals are provided with knowledge about the exact coordinated transmission, e.g., from which points, with what transmission weights, etc. This information can be used for received signal processing at the terminal side, but comes at a cost of increased downlink overhead.

Relaying for LTE-Advanced systems improves the coverage of high data rates, group mobility, temporary network deployment, cell-edge throughput and/or to provide coverage in new areas. Type-I relay nodes are part of LTE-Advanced, and a type-I relay node is an in-band relaying node connecting to the eNB (enhanced NodeB) using the LTE spectrum. The relay is connected to the eNB over a backhaul link, and assists the eNB in communicating with a UE terminal over an access link between the relay and the terminal. For a type-I relay, the transmission on the backhaul link (i.e., eNB-to-relay) and the transmission on the access link (i.e., relay-to-UE) are independent. That is, the relay receives data from the eNB over the backhaul link and then forwards the data to the corresponding UE over the access link. As such, the UE views the relay as an eNB.

CoMP can be used for the transmission on the backhaul link since the relay assisting the eNB uses LTE techniques and the LTE spectrum. Similar to normal CoMP transmission between eNBs and UEs, CoMP transmission on the backhaul link also requires CSI about the backhaul link to be available at the eNB., e.g., to update the backhaul link transmission scheme and/or modify the precoding scheme to improve the backhaul link data rate to the relay.

In some cases, a UE estimates the channel responses on some frequency sub-carriers, quantizes the channel responses to digital bits, and feeds back the quantized CSI to the eNB. In response, the eNB reconstructs the channel response for the entire bandwidth. In other cases, each UE may report CSI on only a part of the entire bandwidth. By doing so, the total feedback bits can be reduced. In yet other cases, the total available feedback bits are allocated to different links based on their long term statistics. With this scheme, the feedback mechanism can be used more efficiently. CSI feedback schemes that comprise long-term and short-term feedback mechanisms have been proposed for the access link between the eNB and UE. For these solutions, second-order statistics (e.g., power delay profile) of the channel are considered as the long-term, slow-varying part. Only the second-order statistic is considered because the channel between the eNB and UE typically has little or no line-of-sight components, and thus feedback of first-order channel statistics is not an efficient use of network resources.

Each of these conventional CSI feedback schemes are designed mainly for CoMP transmission between eNBs and UEs. Directly applying these CSI feedback schemes to the backhaul link between an eNB and a relay assisting the eNB is not efficient because the channel characteristics of the backhaul link may differ extensively from those of the eNB-to-UE link. For example, relays are typically fixed once deployed. Hence the channel responses between eNBs and relays change rather slowly, at least for the slow-changing part. The slow varying property provides the possibility to feed back CSI less frequently, at least for the slow-changing part. In addition, relays are typically deployed with line of sight (LOS) to the corresponding eNB. Such a LOS channel has smaller delay spread compared with an eNB-to-UE channel, which in turn leads to larger coherent bandwidth compared to the eNB-to-UE channel. Less CSI feedback is therefore needed for a given bandwidth. Furthermore, relays can only feed back CSI in uplink backhaul subframes. Due to the time division mechanism between the backhaul link (relay-to-eNB) and the access link (relay-to-UE), there are fewer uplink backhaul subframes available than eNB-to-UE uplink subframes. Hence relays have less resource to report CSI compared with a UE, and thus desirable for relays to feed back CSI more efficiently. Conventional CSI feedback schemes are designed based on the eNB-to-UE link, and properties of the backhaul link (relay-to-eNB) are not considered. Such schemes are not efficient for the backhaul link if applied directly.

SUMMARY

The embodiments disclosed herein utilize the properties of the backhaul link, e.g., rather static and relatively large coherent bandwidth, to enhance the reporting of channel information about the backhaul link from a relay to a base station assisted by the relay in communicating with a mobile device such as a UE terminal. In the time domain, the channel response of the backhaul link can be viewed as the sum of two parts: a slow-changing (mean) part and a fast-changing (varying) part. The fast-changing part is fed back from the relay to the base station more frequently, and the slow-changing part is fed back less frequently. In the frequency domain, the channel response of the backhaul link can also be viewed as the sum of two parts: a relatively flat (mean) part and a frequency-varying part. One or a few feedbacks are needed to report the relatively flat part for the entire bandwidth of the backhaul channel. More feedback may be used to report the frequency-varying part from the relay to the base station for the entire bandwidth. Within what period (time and/or frequency) the mean is calculated depends on the coherent time and/or coherent bandwidth of the backhaul channel. The dynamic range of each feedback for the fast changing part and the frequency-varying part is reduced compared with the conventional feedback of the eNB-to-UE link. Therefore, the overall amount of channel information feedback is reduced compared with direct application of conventional feedback schemes designed for the eNB-to-UE link.

According to an embodiment of a method for feeding back a channel response estimate of a backhaul link established between a base station and a relay that assists the base station in communicating with a mobile device over an access link established between the relay and the mobile device, the method includes estimating a first part of the backhaul link channel response by calculating an average of the backhaul link channel response over a predetermined period at the relay. A second part of the backhaul link channel response is estimated by calculating variation in the backhaul link channel response over the predetermined period at the relay, the second part of the backhaul link channel response changing faster than the first part. Quantized versions of the first and second parts of the backhaul link channel response are transmitted from the relay to the base station over the backhaul link.

According to an embodiment of a relay, the relay includes a first interface, a second interface and a channel response processor. The first interface is operable to connect the relay to a base station over a backhaul link between the relay and the base station. The second interface is operable to connect a mobile device in communication with the base station to the relay over an access link between the relay and the mobile device. The channel response processor is operable to estimate a first part of a channel response of the backhaul link by calculating an average of the backhaul link channel response over a predetermined period at the relay. The channel response processor is also operable to estimate a second part of the backhaul link channel response by calculating variation in the backhaul link channel response over the predetermined period at the relay, the second part of the backhaul link channel response changing faster than the first part. The channel response processor is further operable to quantize the first and second parts of the backhaul link channel response for transmission to the base station over the backhaul link.

According to an embodiment of a base station, the base station includes an interface operable to connect the base station to a relay over a backhaul link established between the relay and the base station and a baseband processor. The baseband processor is operable to receive first and second quantized parts of a backhaul link channel response determined at the relay for the backhaul link. The first quantized part of the backhaul link channel response corresponds to an average of the backhaul link channel response calculated over a predetermined period and the second quantized part of the backhaul link channel response corresponds to a variation in the backhaul link channel response calculated over the predetermined period, the second part of the backhaul link channel response changing faster than the first part. The baseband processor is further operable to combine the first and second quantized parts of the backhaul link channel response to generate composite state information for the backhaul link and update one or more transmission properties associated with the backhaul link based on the composite backhaul link state information.

Of course, the present invention is not limited to the above features and advantages. Those skilled in the art will recognize additional features and advantages upon reading the following detailed description, and upon viewing the accompanying drawings.

DETAILED DESCRIPTION

Figure 1:
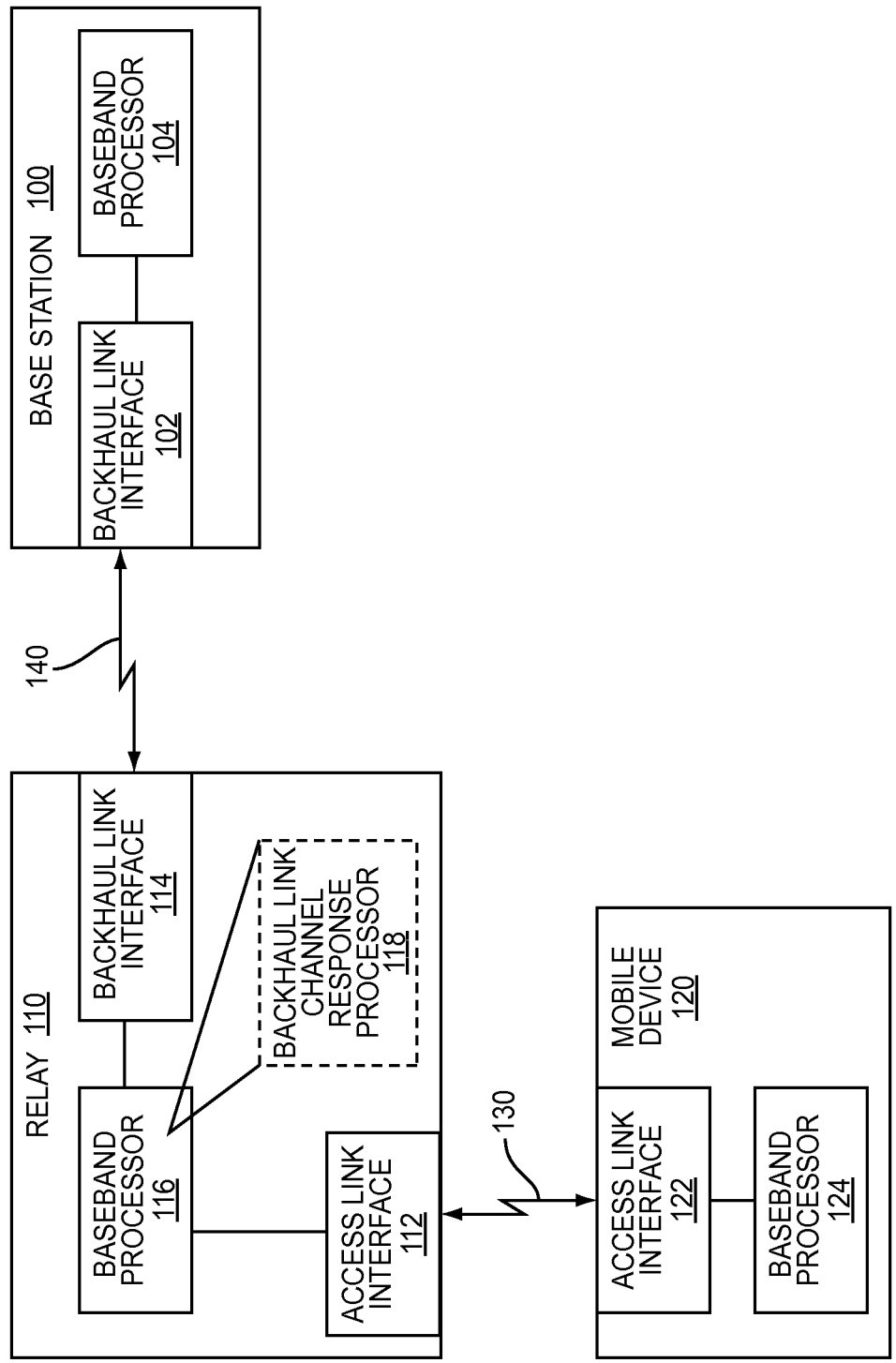
FIG. 1 illustrates an embodiment of a base station, a relay and a mobile device located in a CoMP transmission/reception system.

FIG. 1 illustrates a base station 100 such as an eNB, a relay 110 and a mobile device 120 such as a UE terminal located in a CoMP transmission/reception system. The relay 110 assists the base station 100 in communicating with the mobile device 120, thus extending coverage and enhancing throughput. The relay 110 communicates with the mobile station 120 over an access link 130 established between the relay 110 and the mobile device 120. The relay 110 communicates with the base station 100 over a backhaul link 140 established between the relay 110 and the base station 100. The relay 110 communicates in uplink and downlink directions over both links 130, 140. To this end, the relay 110 and the mobile device 120 each include an access link interface 112, 122 for communicating over the access link 130. The base station 100 and the relay 110 each include a backhaul link interface 114, 102 for communicating over the backhaul link 140. The mobile device 120 views the relay 110 as a base station and the base station 100 views the relay 110 as a UE terminal. The mobile device 120, base station 100 and relay 110 each include respective baseband processors 124, 104, 116 for implementing baseband operations.

The relay 110 can be temporarily or permanently deployed, e.g., with LOS to the base station 100. Once deployed, the position of the relay 110 remains generally fixed for relatively long periods of time. Such a deployment leads to an eNB-to-relay backhaul channel quite different from a typical eNB-to-UE channel. For example, the backhaul channel has larger coherent time and larger coherent bandwidth. The relay 110 directly reports state information about the backhaul channel to the base station 100 for processing, e.g., so that the base station 100 can update the backhaul link transmission scheme and/or modify the precoding scheme to improve the backhaul link data rate to the relay 110.

The relay 110 has a backhaul link channel response processor 118 included in or associated with the relay baseband processor 116 for determining the channel state information of the backhaul link 140 for a predetermined period. The predetermined period can be time and/or frequency depending on the type of communication protocol implemented within the CoMP system. The backhaul link channel response processor 118 determines the channel state information in two parts. The first part is an average (or flat) part of the backhaul channel response and the second part is the varying part of the backhaul channel response. The relay 110 separately feeds back both parts to the base station 100 via uplink channels over the backhaul link 140. In one embodiment, the time and/or frequency period over which the backhaul link channel response processor 118 determines the average and varying parts of the channel state information is based on the coherent time and/or coherent bandwidth of the backhaul channel.

Figure 2:
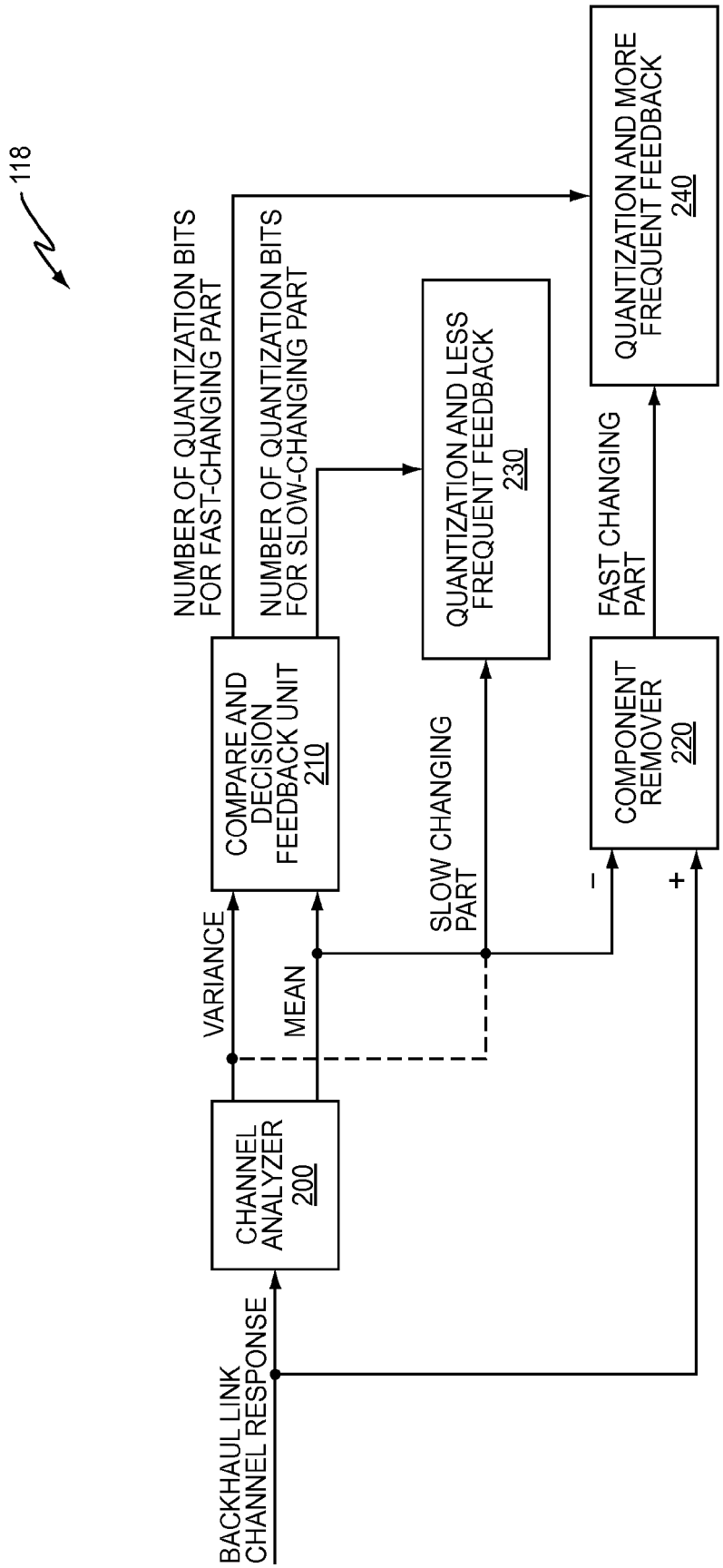
FIG. 2 illustrates an embodiment of a backhaul link channel response processor included in the relay of FIG. 1.

FIG. 2 illustrates an embodiment of the backhaul link channel response processor 118 for calculating the average and variance of the backhaul link channel response over a predetermined time period. To characterize the time-varying property of the backhaul link channel response, the channel response is divided into a slow-changing (mean) part and a fast-changing part. A large fraction of the energy typically comes from the slow-changing part, e.g., from direct propagation, reflection from large buildings, etc. A small fraction of the energy comes from the fast-changing part, e.g., reflection from moving cars, trees, etc. The slow-changing part changes mainly due to environmental changes, e.g., rain, etc. and therefore the change can be considered relatively slow. The backhaul link 140 typically has a larger coherent bandwidth than an eNB-to-UE link. An uncorrelated fraction of the backhaul link channel response comes from the fast-changing part, which is feedback more frequently. However, the fast-changing part typically has much less energy than the slow-changing part as explained above, and therefore fewer bits are needed to feed back the fast-changing part compared with feeding back the entire channel response directly. The relay 110 utilizes these characteristics of the backhaul link 140 to optimize generation and reporting of backhaul link channel state information.

The slow-changing part of the channel state information is fed back relatively slowly, e.g., once every few seconds. The fast-changing part is fed back more frequently, e.g., with a similar time scale used for a conventional eNB-to-UE link. However, because the fast-changing part has a small dynamic range, the number of bits needed each time to feedback the fast-changing part is relatively small. Accordingly, the overall number of bits needed to feedback all of the backhaul channel state information from the relay 110 to the base station 100 is greatly reduced, particularly when the variance of the backhaul channel response is relatively small.

The backhaul link channel response processor 118 includes a channel analyzer 200, a compare and decision feedback unit 210, a component remover 220, and quantization units 230, 240. The channel analyzer 200 processes an instantaneous backhaul link channel response estimate generated by the relay baseband processor 116 and calculates the mean and variance of the backhaul channel response over a predetermined period of time, e.g., several TTIs (Transmission Time Intervals) for UMTS (Universal Mobile Telecommunications System). The mean part (i.e., the slow-changing part) of the channel response is removed from the instantaneous backhaul channel response by the component remover 220 to determine the variation in the backhaul link channel response (i.e., the fast-changing part).

In one embodiment, the slow-changing part of the backhaul link channel response includes both the mean and variance of the backhaul link channel response calculated by the channel analyzer 200 as indicated by the dashed line in the Figures. According to this embodiment, the component remover 220 subtracts the mean from the instantaneous estimate of the backhaul link channel response to estimate the fast-changing part of the backhaul link channel response and scales the fast-changing part based on the variance prior to quantization. This way, performance can be improved when a quantizer with a fixed dynamic range is used to quantize the fast-changing part of the backhaul link channel response. The base station 100 can extract the variance from the quantized slow-changing part of the backhaul link channel response upon receipt from the relay 110, and use the extracted variance information to normalize the fast-changing part of the backhaul link channel response as described later herein.

The compare and decision feedback unit 210 of the backhaul link channel response processor 118 allocates bits for quantizing the slow-changing and fast-changing parts of the backhaul link channel response based on the mean and variance calculated by the channel analyzer 200 over the predetermined time period. The number of bits provided for quantizing the slow-changing part of the backhaul link channel response is determined as a function of the magnitude of the mean. The first quantization unit 230 generates a quantized version of the first (slow-changing) part of the channel response based on the corresponding bits provided by the compare and decision feedback unit 210. The compare and decision feedback unit 210 also determines the number of bits for quantizing the fast-changing part of the backhaul link channel response as a function of the magnitude of the variation. The second quantization unit 240 generates a quantized version of the second (fast-changing) part of the backhaul link channel response based on the corresponding bits provided by the compare and decision feedback unit 210.

In one embodiment, the compare and decision feedback unit 210 allocates the quantization bits based on which part of the backhaul link channel response represents a larger fraction of the channel energy. More bits are allocated for quantizing the variation (fast-changing part) in the backhaul link channel response than for quantizing the average (slow-changing part) if the magnitude of the average is smaller than the magnitude of the variation. However, if the magnitude of the average of the backhaul link channel response is larger than the magnitude of the variation, the compare and decision feedback unit 210 allocates more bits for quantizing the slow-changing part than for quantizing the fast-changing part.

Figure 3:
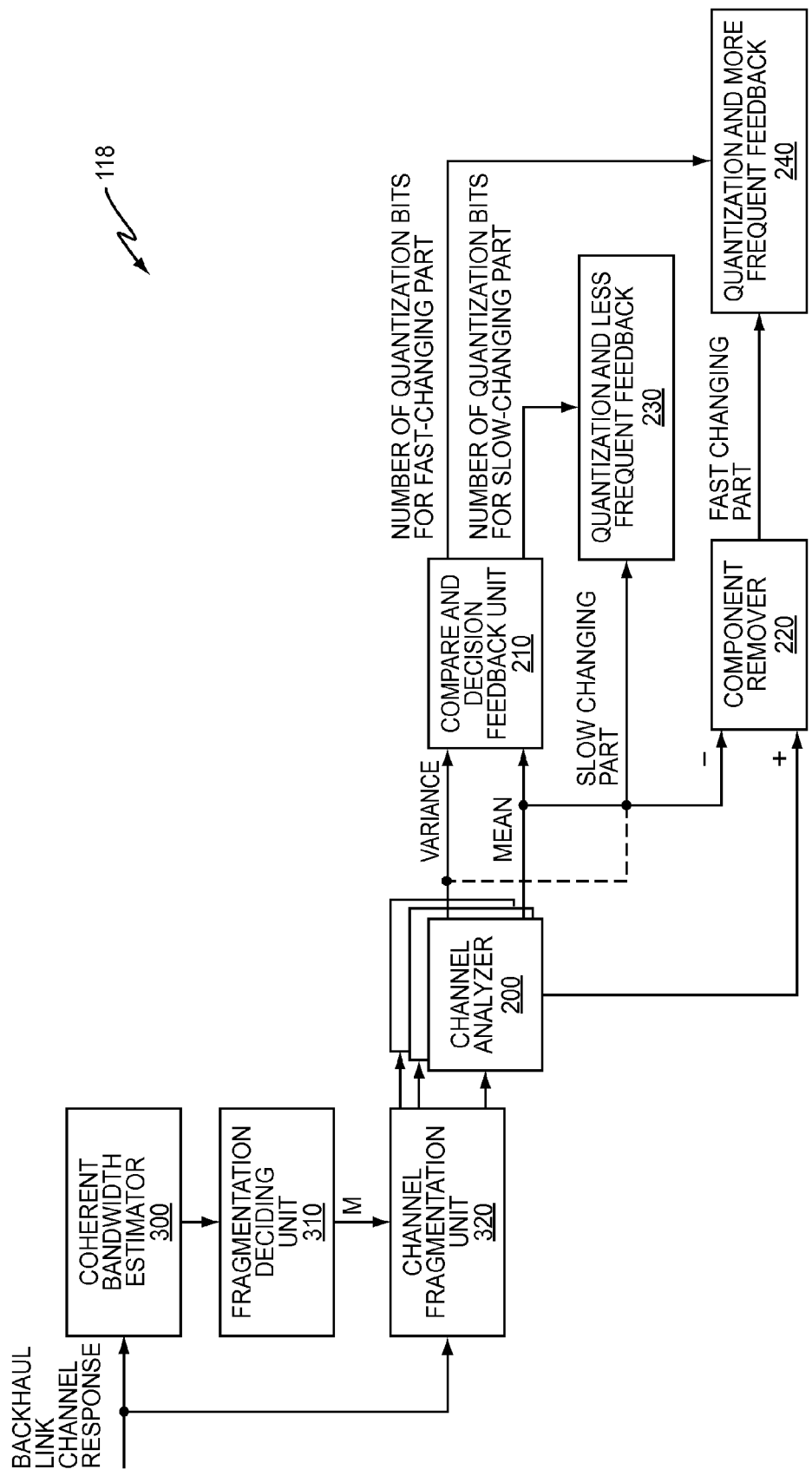
FIG. 3 illustrates another embodiment of a time domain-based backhaul link channel response processor included in the relay of FIG. 1.

FIG. 3 illustrates another embodiment of the backhaul link channel response processor 118 for calculating the average and variance of the backhaul link channel response over subperiods of a predetermined time period. According to this embodiment, the backhaul link channel response processor 118 further includes a bandwidth estimator 300 for estimating the coherent bandwidth of the backhaul channel. The coherent bandwidth is estimated based on the instantaneous backhaul link channel response estimate generated by the relay baseband processor 116. The backhaul link channel response processor 118 also includes a fragmentation deciding unit 310 for dividing the predetermined time period into a number of finer sub-periods (M) as a function of the coherent bandwidth. The predetermined time period is divided into more sub-periods if the coherent bandwidth is relatively small and fewer sub-periods if the coherent bandwidth is relatively large.

A channel fragmentation unit 320 included in the backhaul link channel response processor 118 fragments the instantaneous backhaul link channel response estimate generated by the relay baseband processor 116 as a function of the number of sub-periods determined by the fragmentation deciding unit 310. The channel analyzer 200 then calculates the average and variance of the backhaul link channel response for each of the plurality of time sub-periods. This way, the slow changing part of the backhaul link channel response can be calculated and fed back more frequently (e.g., once per sub-period) to the base station 100 when transmission conditions warrant more frequent feedback. Under most transmission conditions, the backhaul link channel response processor 118 generates the quantized version of the second (fast-changing) part of the backhaul link channel response more frequently and with less bandwidth than the quantized version of the first (slow-changing) part of the backhaul link channel response during each predetermined time period or sub-period. The backhaul link channel response processor 118 can also calculate the average and variance of the backhaul link channel response over a predetermined frequency band.

Figure 4:
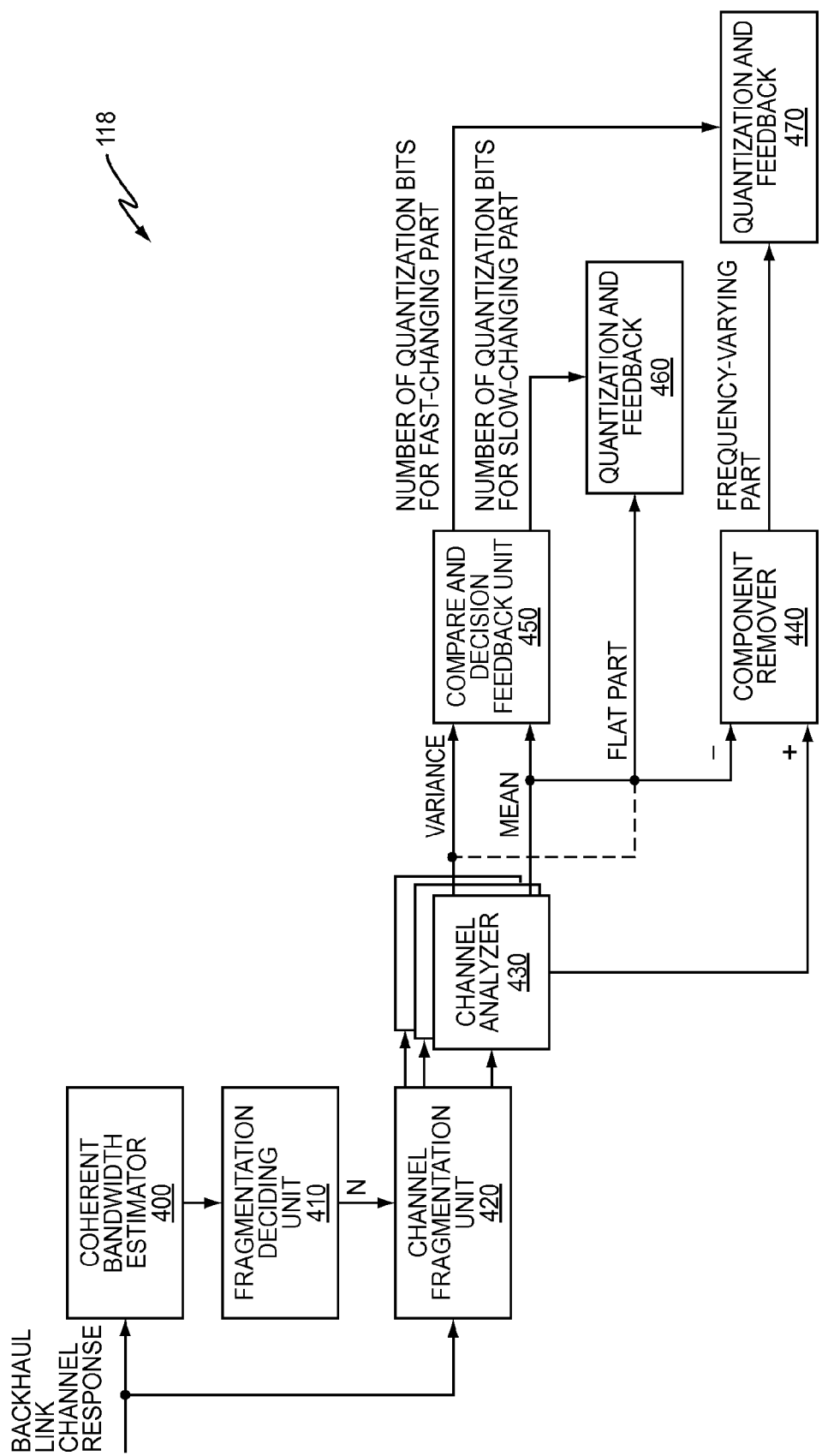
FIG. 4 illustrates yet another embodiment of a frequency domain-based backhaul link channel response processor included in the relay of FIG. 1.

FIG. 4 illustrates an embodiment of the backhaul link channel response processor 118 for calculating the average and variance of the backhaul link channel response over a predetermined frequency band. To characterize the frequency-domain property of the backhaul link channel response, the root mean square (RMS) delay spread of the backhaul channel can be measured. For example, the mean RMS delay spread can be about 49 ns, which is much smaller than that of the eNB-to-UE link (e.g., 310 ns for urban macro-cell environment). As the coherent bandwidth of a channel is inversely proportional to the RMS delay spread, the coherent bandwidth of the backhaul channel can be about 6× that of the eNB-to-UE link. The large coherent bandwidth of the backhaul link channel provides the possibility for less feedback. The backhaul link channel response processor 118 utilizes this information to optimize the feedback of backhaul channel state information to the base station 100.

In more detail, the coherent bandwidth of the backhaul channel is estimated by a bandwidth estimator 400 based on the instantaneous backhaul link channel response estimate generated by the relay baseband processor 116 as described previously herein. A fragmentation deciding unit 410 determines a number of frequency sub-bands (N) over which the backhaul link channel response is to be divided based on the coherent bandwidth. The predetermined frequency band is divided into more sub-bands if the coherent bandwidth is relatively small and fewer sub-periods if the coherent bandwidth is relatively large. A channel fragmentation unit 420 fragmentizes the channel response of the entire bandwidth into N different frequency sub-bands. A channel analyzer 430 calculates the mean and variance of the backhaul channel response for each frequency sub-band.

The mean (i.e., relatively flat) part of the channel response is removed from the instantaneous backhaul link channel response estimate by a component remover 440 to determine the frequency-varying part of the backhaul link channel response. A compare and decision feedback unit 450 allocates bits for quantizing the relatively flat part and the frequency-varying part of the backhaul link channel response based on the mean and variance of the backhaul link channel response calculated for each frequency sub-band. The number of bits for quantizing the relatively flat part of the backhaul link channel response is determined as a function of the magnitude of the mean calculated on a per sub-band basis. A first quantization unit 460 generates a quantized version of the relatively flat part of the backhaul link channel response based on the corresponding bits provided by the compare and decision feedback unit 450. The compare and decision feedback unit 450 also determines the number of bits for quantizing the frequency-varying part of backhaul link channel response as a function of the magnitude of the variation calculated on a per sub-band basis. A second quantization unit 470 generates a quantized version of the frequency-varying part of the backhaul link channel response based on the corresponding bits provided by the compare and decision feedback unit 450.

According to an embodiment, the compare and decision feedback unit 450 allocates the quantization bits based on which part of the backhaul link channel response represents a larger fraction of the channel energy. More bits are allocated for quantizing the frequency-varying part of the backhaul link channel response than for quantizing the relatively flat part if the magnitude of the mean is smaller than the magnitude of the variation. However, if the magnitude of the mean is larger than the magnitude of the variation, the compare and decision feedback unit 450 allocates more bits for quantizing the relatively flat part of the backhaul link channel response. The embodiment shown in FIG. 4 can be combined with either embodiment shown in FIG. 2 or 3 so that the backhaul link channel response processor 118 jointly considers the time and frequency domains.

Figure 5:
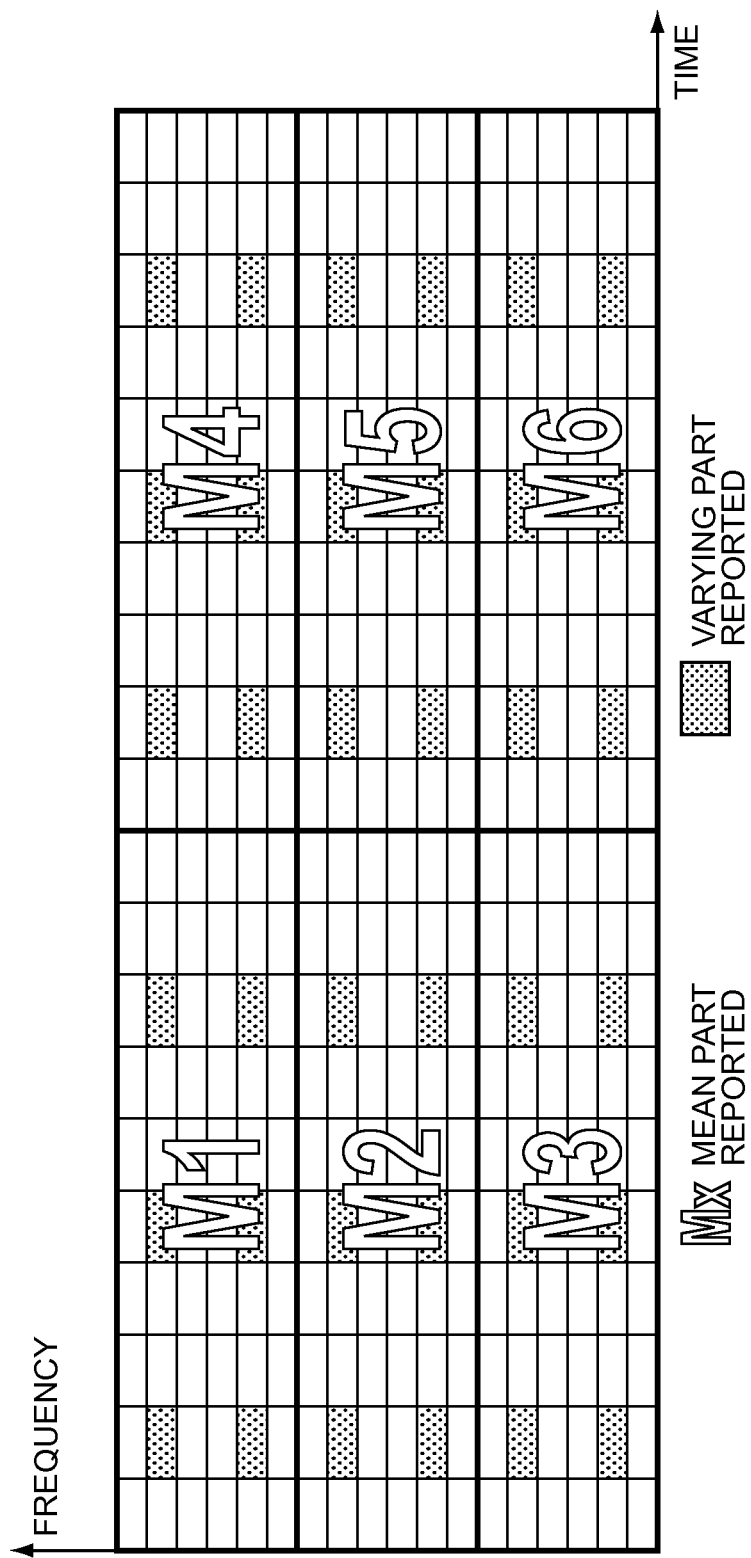
FIG. 5 illustrates an embodiment of a frequency-time grid divided into different blocks for facilitating feedback of backhaul link channel response state information.

FIG. 5 illustrates an embodiment of a frequency-time grid divided into different blocks. Each block represents a particular time period for a particular number of frequency sub-carriers. Six different blocks labeled M1-M6 are shown in FIG. 5 for ease of illustration and explanation only, and should not be considered limiting in any way. The backhaul link channel response processor 118 estimates the coherent bandwidth of the backhaul link channel and fragments the backhaul link channel response for each block as a function of the coherent bandwidth as explained previously herein. For example, the backhaul link channel response is fragmented into six different blocks as shown in FIG. 5. The backhaul link channel response processor 118 calculates the average and variation in the backhaul link channel response for each block as previously explained herein. The first (mean) part of the backhaul link channel response is quantized and reported to the base station less frequently than the second (varying) part. For example, FIG. 5 shows the first (mean) part of the backhaul link channel response being reported to the base station 100 once per block (represented by labels M1-M6) and the second (varying) part being reported on six different occasions per block (represented by the shaded regions in each block). Of course, other reporting intervals for the first and second parts of the backhaul link channel response can be determined as previously described herein. The backhaul link channel response reporting embodiments described herein yield a more efficient CSI feedback for the backhaul channel and consume less uplink overhead as compared to conventional alternatives.

In each case, the relay 110 reports the state information about the backhaul channel to the base station 100 for processing. The state information has a mean (slow-changing) and varying (fast-changing) part as described above. The base station 100 can update one or more transmission properties associated with the backhaul link 140 such as the backhaul link transmission scheme and/or the precoding scheme based on the backhaul link state information received from the relay 110 to improve the backhaul link data rate to the relay 110. In one embodiment, the baseband processor 104 included in the base station 100 reconstructs the slow-changing and fast-changing parts of the backhaul link channel response e.g., by decoding the respective quantized parts. The base station baseband processor 104 then adds the reconstructed slow-changing and fast-changing parts of the backhaul link state information to generate composite state information for the backhaul link 140. The base station baseband processor 104 then updates one or more of the transmission properties associated with the backhaul link 140 based on the composite backhaul link state information.

Figure 6:
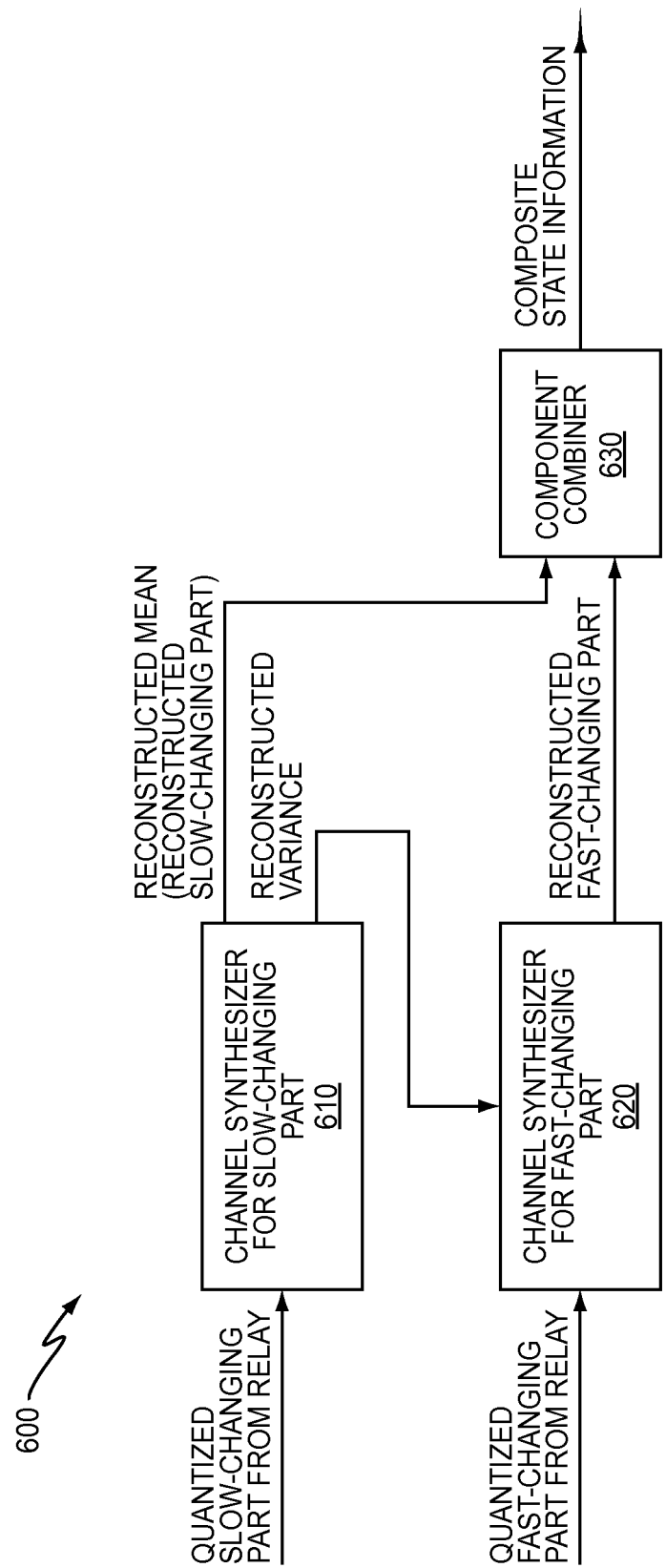
FIG. 6 illustrates an embodiment of a channel response re-constructor included in the base station of FIG. 1.

FIG. 6 illustrates an embodiment of a backhaul link channel response re-constructor 600 included in or associated with the base station baseband processor 104. According to this embodiment, the quantized slow-changing part of the backhaul link channel response received from the relay 110 includes the mean and variance of the backhaul link channel response calculated at the relay 110 as previously described herein. The channel response re-constructor 600 includes a first synthesizer 610 for extracting the mean and variance from the quantized slow-changing part of the backhaul link channel response. The first synthesizer 610 outputs the reconstructed variance of the backhaul link channel response to a second synthesizer 620 of the channel response re-constructor 600 for processing. The first synthesizer 610 also outputs the reconstructed mean to a component combiner 630 of the channel response re-constructor 600, the reconstructed mean representing the slow-changing part of the backhaul link channel response according to this embodiment.

The channel response re-constructor 600 also includes a second synthesizer 620 for reconstructing the quantized fast-changing part of the backhaul link channel response received from the relay 110. In one embodiment, the second synthesizer 620 multiplies the reconstructed fast-changing part of the backhaul link channel response by the square root of the reconstructed variance to normalize the reconstructed fast-changing part of the backhaul link channel response. The second synthesizer 620 outputs the normalized, reconstructed version of the fast-changing part of the backhaul link channel response to the component combiner 630. The component combiner 630 adds the reconstructed mean to the normalized, reconstructed fast-changing part of the backhaul link channel response to generate composite state information for the backhaul link 140 which is used by the base station baseband processor 104 to update one or more of the transmission properties associated with the backhaul link 140 as described previously herein.

With the above range of variations and applications in mind, it should be understood that the present invention is not limited by the foregoing description, nor is it limited by the accompanying drawings. Instead, the present invention is limited only by the following claims, and their legal equivalents.

What is claimed is:

1. A method of feeding back a channel response estimate of a backhaul link established between a base station and a relay that assists the base station in communicating with a mobile device over an access link established between the relay and the mobile device, the method comprising:
   estimating a first part of the backhaul link channel response by calculating an average of the backhaul link channel response over a predetermined period at the relay;
   estimating a second part of the backhaul link channel response by calculating variation in the backhaul link channel response over the predetermined period at the relay, the second part of the backhaul link channel response changing faster than the first part; and
   transmitting a quantized version of the first part of the backhaul link channel response and a quantized version of the second part of the backhaul link channel response from the relay to the base station over the backhaul link.

2. The method of claim 1, wherein the predetermined period is a predetermined time period.

3. The method of claim 2, comprising:
   estimating a coherent time of the backhaul link channel response;
   dividing the predetermined time period into a plurality of time sub-periods as a function of the coherent time; and
   calculating the average and the variation in the backhaul link channel response for each of the plurality of time sub-periods.

4. The method of claim 1, wherein the predetermined period is a predetermined frequency band.

5. The method of claim 4, comprising:
   estimating a coherent bandwidth of the backhaul link channel response;
   dividing the predetermined frequency band into a plurality of frequency sub-bands as a function of the coherent bandwidth; and
   calculating the average and the variation in the backhaul link channel response for each of the plurality of frequency sub-bands.

6. The method of claim 1, wherein the predetermined period is a predetermined time period and frequency band.

7. The method of claim 6, comprising:
   estimating a coherent time and bandwidth of the backhaul link channel response;
   fragmenting the backhaul link channel response into a plurality of blocks as a function of the coherent time and bandwidth; and
   calculating the average and the variation in the backhaul link channel response for each block of the backhaul link channel response.

8. The method of claim 1, comprising removing the average of the backhaul link channel response from an instantaneous estimate of the backhaul link channel response to calculate the variation in the backhaul link channel response.

9. The method of claim 1, comprising:
   quantizing the average of the backhaul link channel response as a function of the magnitude of the average to generate the quantized version of the first part of the backhaul link channel response; and
   quantizing the variation in the backhaul link channel response as a function of the magnitude of the variation to generate the quantized version of the second part of the backhaul link channel response.

10. The method of claim 9, comprising:
    allocating more bits for quantizing the variation in the backhaul link channel response than for quantizing the average of the backhaul link channel response if the magnitude of the average is relatively smaller than the magnitude of the variation; and
    allocating more bits for quantizing the average of the backhaul link channel response than for quantizing the variation in the backhaul link channel response if the magnitude of the average is relatively larger than the magnitude of the variation.

11. The method of claim 10, comprising allocating the bits for quantizing the average and the variation in the backhaul link channel response based on the mean and variance of the backhaul link channel response calculated over the predetermined period.

12. The method of claim 1, comprising transmitting the quantized version of the second part of the backhaul link channel response from the relay to the base station more frequently and with less bandwidth than the quantized version of the first part of the backhaul link channel response.

13. The method of claim 1, wherein the first part of the backhaul link channel response includes the mean and variance of the backhaul link channel response calculated over the predetermined period.

14. The method of claim 13, comprising:
subtracting the mean from an instantaneous estimate of the backhaul link channel response to estimate the second part of the backhaul link channel response; and
scaling the second part of the backhaul link channel response based on the variance prior to quantization.

15. The method of claim 1, wherein the variation in the backhaul link channel response at the relay over the predetermined period is a difference between the average of the backhaul link channel response over the predetermined period and a single estimate of the backhaul link channel response within the predetermined period.

16. A relay, comprising:
a first interface operable to connect the relay to a base station over a backhaul link between the relay and the base station;
a second interface operable to connect a mobile device in communication with the base station to the relay over an access link between the relay and the mobile device; and
a channel response processor operable to:
estimate a first part of a channel response of the backhaul link by calculating an average of the backhaul link channel response over a predetermined period at the relay;
estimate a second part of the backhaul link channel response by calculating variation in the backhaul link channel response over the predetermined period at the relay, the second part of the backhaul link channel response changing faster than the first part; and
quantize the first and second parts of the backhaul link channel response for transmission to the base station over the backhaul link.

17. The relay of claim 16, wherein the predetermined period is a predetermined time period.

18. The relay of claim 17, wherein the channel response processor is operable to estimate a coherent time of the backhaul link channel response, divide the predetermined time period into a plurality of time sub-periods as a function of the coherent time, and calculate the average and the variation in the backhaul link channel response for each of the plurality of time sub-periods.

19. The relay of claim 18, wherein a length of each time sub-period is adaptive and based on the coherent time.

20. The relay of claim 16, wherein the predetermined period is a predetermined frequency band.

21. The relay of claim 20, wherein the channel response processor is operable to estimate a coherent bandwidth of the backhaul link channel response, divide the predetermined frequency band into a plurality of frequency sub-bands as a function of the coherent bandwidth, and calculate the average and the variation in the backhaul link channel response for each of the plurality of frequency sub-bands.

22. The relay of claim 21, wherein the number of frequency sub-bands is adaptive and based on the coherent bandwidth.

23. The relay of claim 16, wherein the predetermined period is a predetermined time period and frequency band.

24. The relay of claim 23, wherein the channel response processor is operable to estimate a coherent time and bandwidth of the backhaul link channel response, fragment the backhaul link channel response into a plurality of blocks as a function of the coherent time and bandwidth, and calculate the average and the variation in the backhaul link channel response for each block of the backhaul link channel response.

25. The relay of claim 16, wherein the channel response processor is operable to remove the average of the backhaul link channel response from an instantaneous estimate of the backhaul link channel response to calculate the variation in the backhaul link channel response.

26. The relay of claim 16, wherein the channel response processor is operable to quantize the average of the backhaul link channel response as a function of the magnitude of the average to generate the quantized version of the first part of the backhaul link channel response, and quantize the variation in the backhaul link channel response as a function of the magnitude of the variation to generate the quantized version of the second part of the backhaul link channel response.

27. The relay of claim 26, wherein the channel response processor is operable to allocate more bits for quantizing the variation in the backhaul link channel response than for quantizing the average of the backhaul link channel response if the magnitude of the average is relatively smaller than the magnitude of the variation, and allocate more bits for quantizing the average of the backhaul link channel response than for quantizing the variation in the backhaul link channel response if the magnitude of the average is relatively larger than the magnitude of the variation.

28. The relay of claim 27, wherein the channel response processor is operable to allocate the bits for quantizing the average and the variation in the backhaul link channel response based on the mean and variance of the backhaul link channel response calculated over the predetermined period.

29. The relay of claim 16, wherein the channel response processor is operable to generate the quantized version of the second part of the backhaul link channel response more frequently and with less bandwidth than the quantized version of the first part of the backhaul link channel response.

30. The relay of claim 16, wherein the first part of the backhaul link channel response includes the mean and variance of the backhaul link channel response calculated over the predetermined period, and wherein the channel response processor is operable to subtract the mean from the first part of the backhaul link channel response to estimate the second part of the backhaul link channel response and scale the second part of the backhaul link channel response based on the variance prior to quantization.

31. The relay of claim 16, wherein the variation in the backhaul link channel response is a difference between the average of the backhaul link channel response over the predetermined period and a single estimate of the backhaul link channel response within the predetermined period.

32. A base station, comprising:
an interface operable to connect the base station to a relay over a backhaul link established between the relay and the base station; and
a baseband processor operable to:
receive first and second quantized parts of a backhaul link channel response determined at the relay for the backhaul link, the first quantized part of the backhaul link channel response corresponding to an average of the backhaul link channel response calculated over a predetermined period and the second quantized part of the backhaul link channel response corresponding to a variation in the backhaul link channel response calculated over the predetermined period, the second part of the backhaul link channel response changing faster than the first part;

reconstruct a first part of the backhaul link channel response based on the first quantized part of the backhaul link channel response and a second part of the backhaul link channel response based on the second quantized part of the backhaul link channel response;

combine the first and second reconstructed parts of the backhaul link channel response to generate composite state information for the backhaul link; and update one or more transmission properties associated with the backhaul link based on the composite backhaul link state information.

33. The base station of claim 32, wherein the first quantized part of the backhaul link channel response includes the mean and variance of the backhaul link channel response calculated at the relay over the predetermined period, and wherein the baseband processor is operable to extract the variance from the first quantized part of the backhaul link channel response, multiply the second reconstructed part of the backhaul link channel response by the square root of the variance to normalize the second reconstructed part of the backhaul link channel response, and add the mean to the normalized second reconstructed part of the backhaul link channel response to generate the composite state information for the backhaul link.

* * * * *